(12) United States Patent
Akasaka

(10) Patent No.: US 7,088,498 B2
(45) Date of Patent: Aug. 8, 2006

(54) OPTICAL AMPLIFICATION OF CWDM CHANNELS USING OPTICAL AMPLIFIERS HAVING FLUORIDE-BASED OPTICAL FIBER

(75) Inventor: Youichi Akasaka, Foster City, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 128 days.

(21) Appl. No.: 10/880,245

(22) Filed: Jun. 29, 2004

(65) Prior Publication Data

US 2005/0286120 A1      Dec. 29, 2005

(51) Int. Cl.
*H01S 3/00* (2006.01)

(52) U.S. Cl. .................. 359/337.4; 359/341.1
(58) Field of Classification Search ............ 359/337.4, 359/341.5, 341.1
See application file for complete search history.

(56) References Cited

U.S. PATENT DOCUMENTS

| | | | |
|---|---|---|---|
| 6,198,870 B1 * | 3/2001 | Kubota et al. ............ | 385/142 |
| 6,205,164 B1 * | 3/2001 | Ohishi et al. ............. | 372/70 |
| 6,563,628 B1 * | 5/2003 | Kitabayashi et al. ..... | 359/337.1 |
| 6,621,622 B1 * | 9/2003 | Krummrich ............. | 359/337.4 |

FOREIGN PATENT DOCUMENTS

EP          1286432          2/2003

OTHER PUBLICATIONS

Y. Akasaka et al.; 100 nm gain bandwidth amplifier based on 980 nm pumped cerium codoped fluoride EDF; Electronics Letters; May 29, 2003; pp. 836-838; Vol. 39, No. 11; Iee Stevenage, GB.
Scott S-H Yam et al.; Hybrid doped fiber amplifier with 100-nm bandwidth for coarse wavelength division multiplexing; Optics Communications; May 15, 2005; pp. 539-542; vol. 249, No. 4-6; North-Holland Publishing Co.; Amsterdam, NL.

\* cited by examiner

*Primary Examiner*—Mark Hellner

(57) ABSTRACT

An optical amplifier system and method are disclosed for amplifying CWDM channels. The optical amplifier system includes a first optical amplifier that includes a fluoride-based optical fiber of a first length and a second optical amplifier that includes a fluoride-based optical fiber of a second length. The first length of fluoride-based optical fiber in the first optical amplifier is different than the second length of fluoride-based optical fiber in the second optical amplifier. When in operation, the first optical amplifier receives optical signals for CWDM channels and amplifies the CWDM channels. The second optical amplifier then receives the optical signals and amplifies the CWDM channels. Between the first optical amplifier and the second optical amplifier, the optical amplifier system generates a continuous gain bandwidth over the CWDM channels.

26 Claims, 5 Drawing Sheets

OPTICAL AMPLIFICATION OF CWDM CHANNELS USING OPTICAL AMPLIFIERS HAVING FLUORIDE-BASED OPTICAL FIBER

BACKGROUND OF THE INVENTION

1. Field of the Invention

The invention is related to the field of optical amplification, and in particular, to optical amplifier systems and methods for amplifying Coarse Wavelength Division Multiplexing (CWDM) channels using optical amplifiers having fluoride-based optical fiber.

2. Statement of the Problem

Many communication companies use fiber optic cabling as a media for transmitting data because of its high bandwidth capacity. The optical fibers of a fiber optic cable can reliably transport optical signals over short or long distances. For shorter distance networks, such as a Fiber to the Premises (FTTP) network or a Metro Access network, Coarse Wavelength Division Multiplexing (CWDM) has been used as a cost effective way to transport voice and data over CWDM channels. CWDM networks reduce the overall cost of a network by using widened channel spacing. The International Telecommunication Union (ITU) defined CWDM channels as channels having 20 nm spacing. Because of the wide channels spacing, CWDM networks can use less expensive lasers to transmit optical signals making them desirable for certain applications.

One concern with CWDM networks is capacity. Because of the 20 nm spacing between CWDM channels, not as many channels can be used which results in a limited capacity. To add capacity to a CWDM network, network administrators can replace a CWDM channel with multiple Dense Wavelength Division Multiplexing (DWDM) channels. Typical DWDM channels have a channel spacing of less than 2 nm. Multiple DWDM channels can be used in the place of a CWDM channel, which increases the capacity of the network. The lasers of a DWDM network are more expensive than the lasers of a CWDM network, but they may be necessary to add the needed capacity. Networks deploying both CWDM channels and DWDM channels are referred to as CWDM/DWDM hybrid networks.

Another concern with CWDM networks or CWDM/DWDM hybrid networks is distance. There currently is not an effective solution for amplifying the multiple CWDM channels to prolong the distance of a CWDM network. Most current CWDM networks do not have any amplification between the core network and the customer premises. Some vendors have proposed using Semiconductor Optical Amplifiers (SOA) to amplify the CWDM channels if distance becomes an issue. Unfortunately, no practical solution for using SOAs has been proposed. Individual SOAs would have to be equipped for each CWDM channel because of the SOA's low optical output power and severe degradation due to fiber nonlinearity effects. Another amplification solution for CWDM networks or CWDM/DWDM hybrid networks is needed.

SUMMARY OF THE SOLUTION

The invention helps solve the above and other problems by amplifying CWDM channels using optical amplifiers having fluoride-based optical fiber. The optical amplifiers of the invention advantageously help solve the distance problem of CWDM networks or CWDM/DWDM hybrid networks by generating a wide, continuous gain bandwidth over multiple CWDM channels. As compared to the SOA solution proposed by some vendors, the optical amplifiers of the invention cause no Cross Gain Modulation (XGM), less Polarization Dependent Gain (PDG), higher total output power, and equivalently wide gain bandwidth.

One embodiment of the invention comprises an optical amplifier system for amplifying CWDM channels of a CWDM network. The optical amplifier system includes a first optical amplifier and a second optical amplifier. The first optical amplifier includes a fluoride-based optical fiber of a first length. The second optical amplifier includes fluoride-based optical fiber of a second length. The first length of fluoride-based optical fiber in the first optical amplifier is different than the second length of fluoride-based optical fiber in the second optical amplifier.

When in operation, the first optical amplifier receives optical signals for CWDM channels. The first optical amplifier amplifies the CWDM channels. The second optical amplifier then receives the optical signals for the CWDM channels. The second optical amplifier also amplifies the CWDM channels. Between the first optical amplifier and the second optical amplifier, the optical amplifier system generates a continuous gain bandwidth over the CWDM channels.

The invention may include other embodiments described below.

DESCRIPTION OF THE DRAWINGS

The same reference number represents the same element on all drawings.

DETAILED DESCRIPTION OF THE INVENTION

FIGS. 1–9 and the following description depict specific embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention.

Those skilled in the art will appreciate that the features described below can be combined in various ways to form multiple variations of the invention. As a result, the invention is not limited to these specific embodiments described below, but only by the claims and their equivalents.

Figure 1:
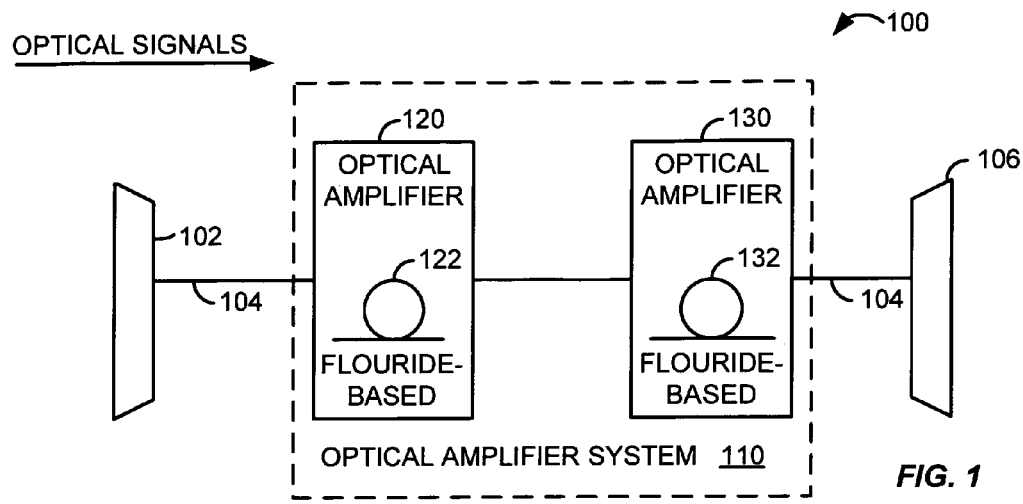
FIG. 1 illustrates a Coarse Wavelength Division Multiplexing (CWDM) network in an embodiment of the invention.

FIG. 1 illustrates a Coarse Wavelength Division Multiplexing (CWDM) network 100 in an embodiment of the invention. CWDM network 100 is comprised of a multiplexer 102, a span of transmission fiber 104, and a de-multiplexer 106. Also included in CWDM network 100 is an optical amplifier system 110 connected to transmission fiber 104. Optical amplifier system 110 includes an optical amplifier 120 and an optical amplifier 130. Optical amplifier 120 includes a fluoride-based optical fiber 122 of a first length. Optical amplifier 130 includes a fluoride-based optical fiber 132 of a second length. CWDM network 100 may include other components, devices, or systems not shown in FIG. 1.

Fluoride-based optical fiber 122 of optical amplifier 120 and fluoride-based optical fiber 132 of optical amplifier 130 may comprise fluoride-based erbium doped fiber (EDF), cerium co-doped fluoride-based erbium doped fiber, or any other type of fluoride-based fiber. Alternatively, optical amplifier 120 and optical amplifier 130 may include another type of optical fiber having similar gain characteristics to a fluoride-based fiber. The first length of fluoride-based optical fiber 122 of optical amplifier 120 is different than the second length of fluoride-based optical fiber 132 of optical amplifier 130. For instance, the length of fluoride-based optical fiber 122 in optical amplifier 120 is in the range of twice as long to four-times as long as the length of fluoride-based optical fiber 132 in optical amplifier 130.

When in operation, transmission fiber 104 of CWDM network 100 transports optical signals for a plurality of CWDM channels. CWDM network 100 may comprise a Fiber to the Premises (FTTP) network, a Metro Access network, or another type of CWDM network.

Figure 2:
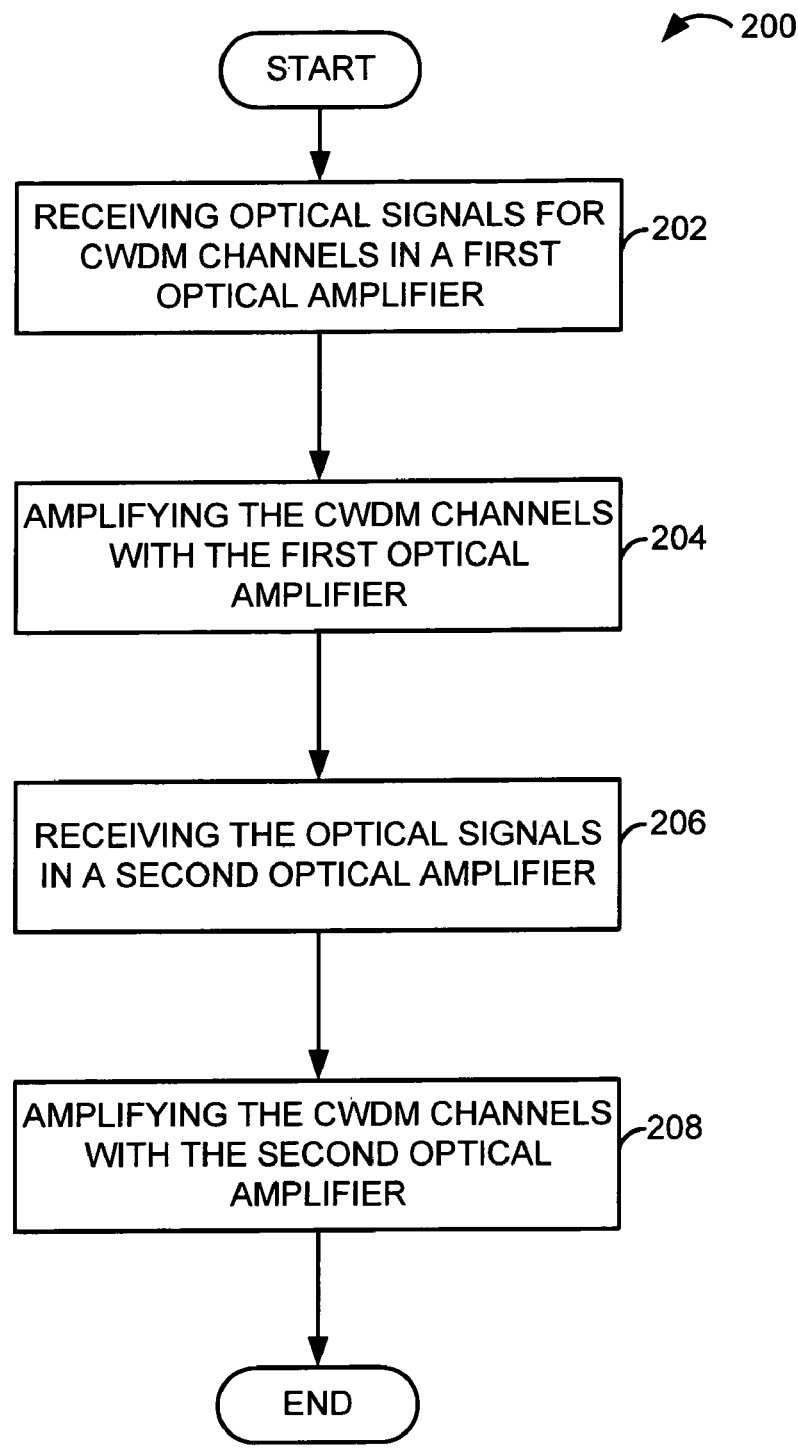
FIG. 2 is a flow chart illustrating a method of amplifying CWDM channels in an embodiment of the invention.

FIG. 2 is a flow chart illustrating a method 200 of amplifying the CWDM channels in an embodiment of the invention. Optical amplifier 120 receives the optical signals for the CWDM channels in step 202. In step 204, optical amplifier 120 amplifies the CWDM channels. Optical amplifier 120 may not generate the same gain for each CWDM channel. Optical amplifier 120 may generate a higher gain in the CWDM channels having longer wavelengths or shorter wavelengths depending on the length of fluoride-based optical fiber 122 in optical amplifier 120. In step 206, optical amplifier 130 receives the optical signals. In step 208, optical amplifier 130 amplifies the CWDM channels. Optical amplifier 130 may not generate the same gain in each CWDM channel. Optical amplifier 130 may generate a higher gain in the CWDM channels having longer wavelengths or shorter wavelengths depending on the length of fluoride-based optical fiber 132 in optical amplifier 130. Between optical amplifier 120 and optical amplifier 130, optical amplifier system 100 generates a continuous gain bandwidth over the CWDM channels. Method 200 may include additional steps not shown in FIG. 2.

Figure 3:
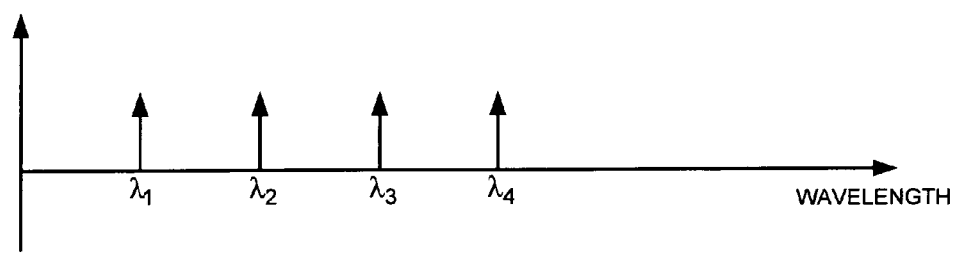
FIG. 3 illustrates CWDM channels for the network of FIG. 1 in an embodiment of the invention.

FIG. 3 illustrates the CWDM channels for network 100 of FIG. 1. FIG. 3 shows four CWDM channels ($\lambda_1$–$\lambda_4$) covering a bandwidth of 80 nm. The four CWDM channels are shown for the sake of illustration and there may be more or less CWDM channels in other embodiments. In order to utilize the advantages of optical amplifier system 110, at least three CWDM channels should be used.

Figure 4:
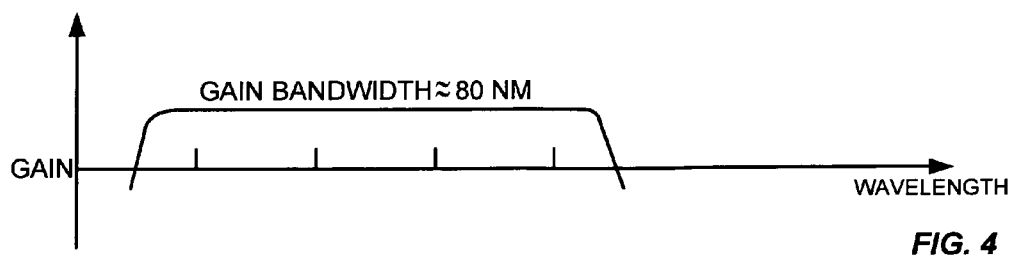
FIG. 4 illustrates the gain bandwidth generated by the optical amplifier system of FIG. 1 in relation to the CWDM channels in an embodiment of the invention.

FIG. 4 illustrates the gain bandwidth generated by optical amplifier system 110 in relation to the CWDM channels. FIGS. 3–4 are stacked vertically to show wavelengths corresponding with one another. The total gain bandwidth of optical amplifier system 110 is about 80 nm in FIG. 4. Optical amplifier system 110 may generate a total gain bandwidth between 80 nm and 100 nm in other embodiments. Between optical amplifier 120 and optical amplifier 130, optical amplifier system 110 generates a continuous gain bandwidth over the four CWDM channels. Optical amplifiers 120 and 130 may not generate the same gain for each of the CWDM channels. For instance, the longer length of fluoride-based optical fiber 122 of optical amplifier 120 in comparison to the length of fluoride-based optical fiber 132 of optical amplifier 130 generates a higher gain for the longer wavelengths of the CWDM channels. Also, the shorter length of fluoride-based optical fiber 132 of optical amplifier 130 in comparison to the length of fluoride-based optical fiber 122 of optical amplifier 120 generates a higher gain for the shorter wavelengths of the CWDM channels.

Figure 5:
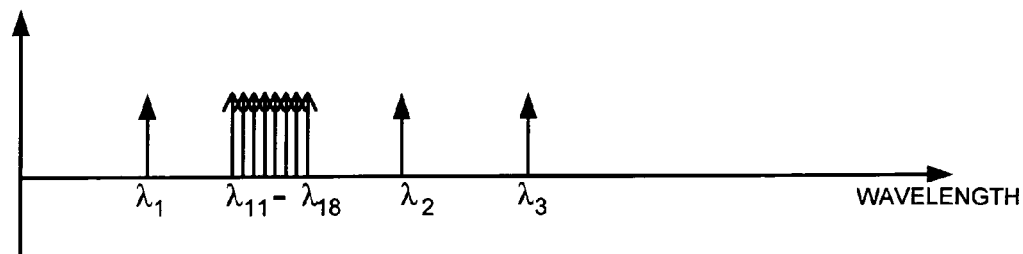
FIG. 5 illustrates CWDM channels and DWDM channels for the network of FIG. 1 in an embodiment of the invention.

Optical amplifier system 100 may also be used in CWDM/DWDM hybrid networks. Assume that one or more of the CWDM channels in FIG. 3 are replaced by a plurality of DWDM channels to increase the capacity of network 100 in FIG. 1. Network 100 would thus become a CWDM/DWDM hybrid network. FIG. 5 illustrates the DWDM channels and the remaining CWDM channels for network 100 of FIG. 1. FIG. 5 shows three CWDM channels ($\lambda_1$–$\lambda_3$) and eight DWDM channels ($\lambda_{11}$–$\lambda_{18}$). The three CWDM channels and the eight DWDM channels are shown for the sake of illustration and there may be more or less CWDM channels and DWDM channels in other embodiments.

Figure 6:
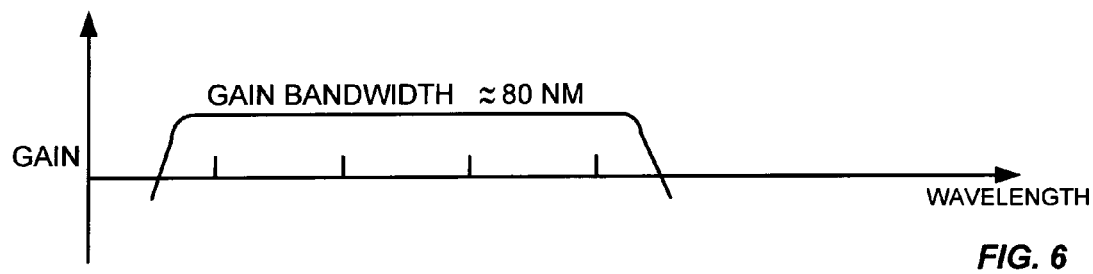
FIG. 6 illustrates the gain bandwidth generated by the optical amplifier system of FIG. 1 in relation to the CWDM channels and the DWDM channels in an embodiment of the invention.

FIG. 6 again illustrates the gain bandwidth generated by optical amplifier system 110 in relation to the CWDM channels and the DWDM channels. FIGS. 5–6 are stacked vertically to show wavelengths corresponding with one another. The total gain bandwidth of optical amplifier system 110 is about 80 nm in FIG. 6. Optical amplifier system 110 may generate a total gain bandwidth between 80 nm and 100 nm in other embodiments. Between optical amplifier 120 and optical amplifier 130, optical amplifier system 110 generates a continuous gain bandwidth over the three CWDM channels and the eight DWDM channels.

Figure 7:
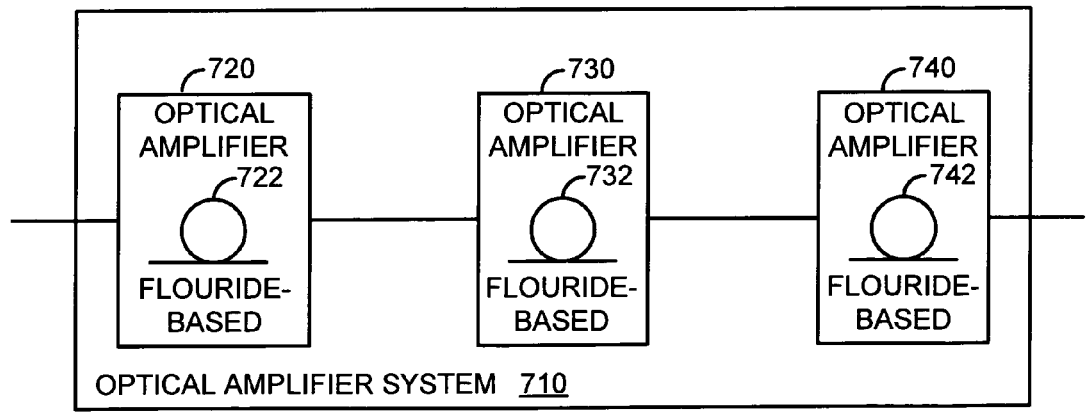
FIG. 7 illustrates an optical amplifier system that includes three cascaded optical amplifiers in another embodiment of the invention.

Optical amplifier system 110 in FIG. 1 may include more than two cascaded optical amplifiers in other embodiments. For instance, FIG. 7 illustrates an optical amplifier system 710 that includes three cascaded optical amplifiers 720, 730, and 740 in another embodiment of the invention. Optical amplifier 720 includes a fluoride-based optical fiber 722 of a first length. Optical amplifier 730 includes a fluoride-based optical fiber 732 of a second length. Optical amplifier 740 includes a fluoride-based optical fiber 742 of a third length.

The fluoride-based optical fibers 722, 732, 742 of optical amplifiers 720, 730, and 740, respectively, may comprise fluoride-based erbium doped fiber (EDF), cerium co-doped fluoride-based erbium doped fiber, or any other type of fluoride-based fiber. The length of fluoride-based optical fiber 732 in optical amplifier 730 is different than the length of fluoride-based optical fiber 722 in optical amplifier 720. Similarly, the length of fluoride-based optical fiber 742 in optical amplifier 740 is different than the length of fluoride-based optical fiber 732 in optical amplifier 730 and the length of fluoride-based optical fiber 722 in optical amplifier 720.

When in operation, optical amplifier 720 receives optical signals for CWDM channels (or CWDM channels and DWDM channels) and amplifies the CWDM channels. Optical amplifier 730 receives the optical signals and amplifies the CWDM channels. Optical amplifier 740 receives the optical signals and amplifies the CWDM channels. Optical amplifiers 720, 730, and 740 generate a higher gain at different wavelengths depending on the length of fluoride-based optical fiber in the optical amplifiers. In combination, optical amplifiers 720, 730, and 740 generate a continuous gain bandwidth between 80 nm and 120 nm.

Figure 8:
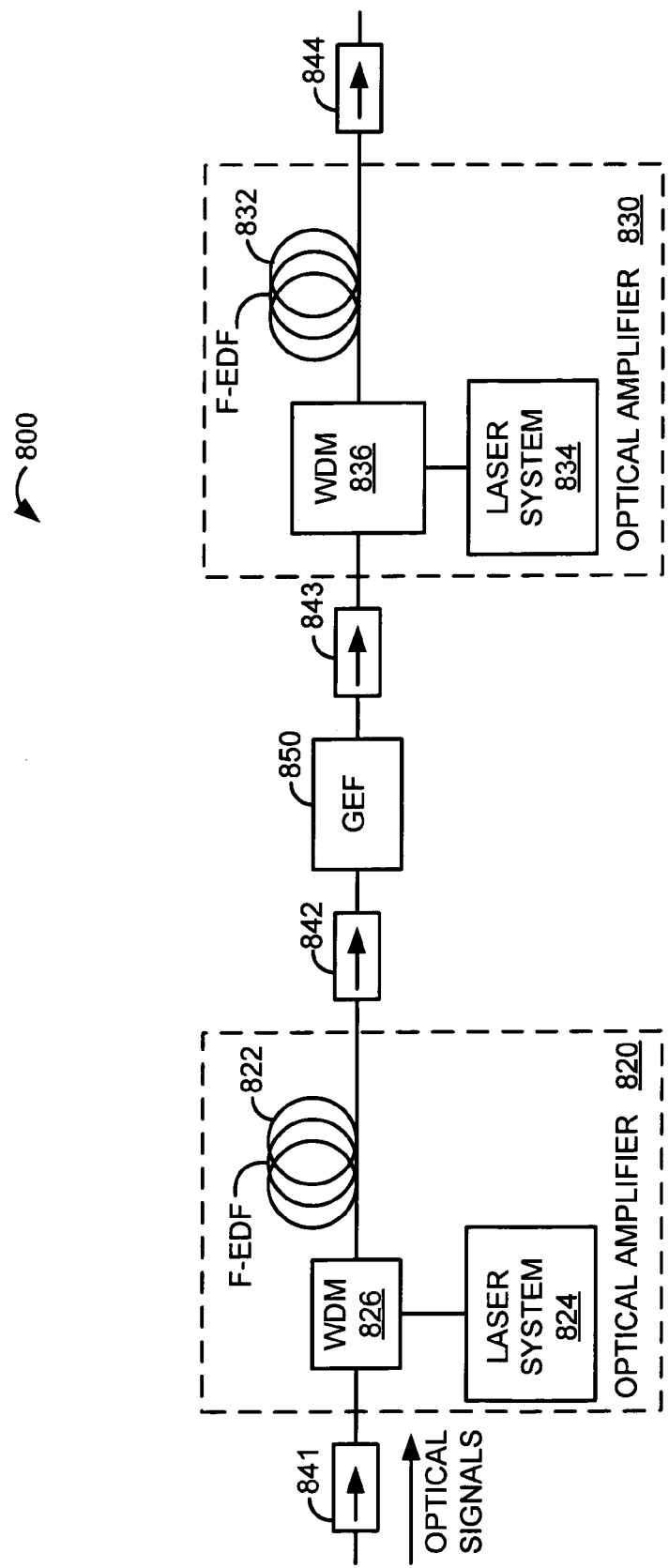
FIG. 8 illustrates a two-stage optical amplifier system in another embodiment of the invention.

FIG. 8 illustrates a two-stage optical amplifier system 800 in another embodiment of the invention. Optical amplifier system 800 includes an optical amplifier 820, an optical amplifier 830, a plurality of isolators 841–844, and a gain equalization filter (GEF) 850. Optical amplifier 820 includes a fluoride-based erbium doped fiber (F-EDF) 822, a laser system 824, and a Wavelength Division Multiplexer (WDM) 826. Optical amplifier 830 includes F-EDF 832, a laser system 834, and a WDM 836. Optical amplifier system 800 may include other devices, components, or systems not shown in FIG. 8. For instance, optical amplifier system 800 may include a second gain equalization filter connected to isolator 844 to flatten the gain after optical amplifier 830.

In optical amplifier 820, WDM 826 connects laser system 824 to F-EDF 822 so that laser system 824 can pump F-EDF 822 at the desired wavelength. In optical amplifier 830, WDM 836 connects laser system 834 to F-EDF 832 so that laser system 834 can pump F-EDF 832 at the desired wavelength. Laser systems 824 and 834 may comprise laser diodes or other devices capable of pumping F-EDF 822 and F-EDF 832. In this embodiment, laser systems 824 and 834 each comprise a single 980 nm laser diode set to a power of about 250 mW.

Individually, F-EDF 822 and 832 have inherently wide gain bandwidths when pumped at a desired wavelength. For optical amplifier system 800, F-EDF 822 and 832 have a different length. By cascading F-EDFs of different lengths, each optical amplifier 820 and 830 has different performance characteristics. In this embodiment, F-EDF 822 in optical amplifier 820 has a length of about 75 cm. F-EDF 832 in optical amplifier 830 has a length of about 25 cm. The concentration of Erbium in each of F-EDF 822 and F-EDF 832 is about 1 mol % (10,000 ppm).

Assume for illustration that optical amplifier system 800 receives optical signals representing eight channels from approximately 1520 nm to 1600 nm with about 10 nm channel spacing. Also assume that the signal power is set to about −16 dBm. Optical amplifier 820 receives the optical signals through isolator 841. Laser system 824 pumps F-EDF 822 to generate a gain for the channels. Optical amplifier 820 generates some gain for each of the channels, but generates a higher gain in range of about 1540 nm to 1570 nm due to the longer length of F-EDF 822. The length of F-EDF 822 may be set to amplify certain wavelengths, such as the wavelengths in the L-band.

Figure 9:
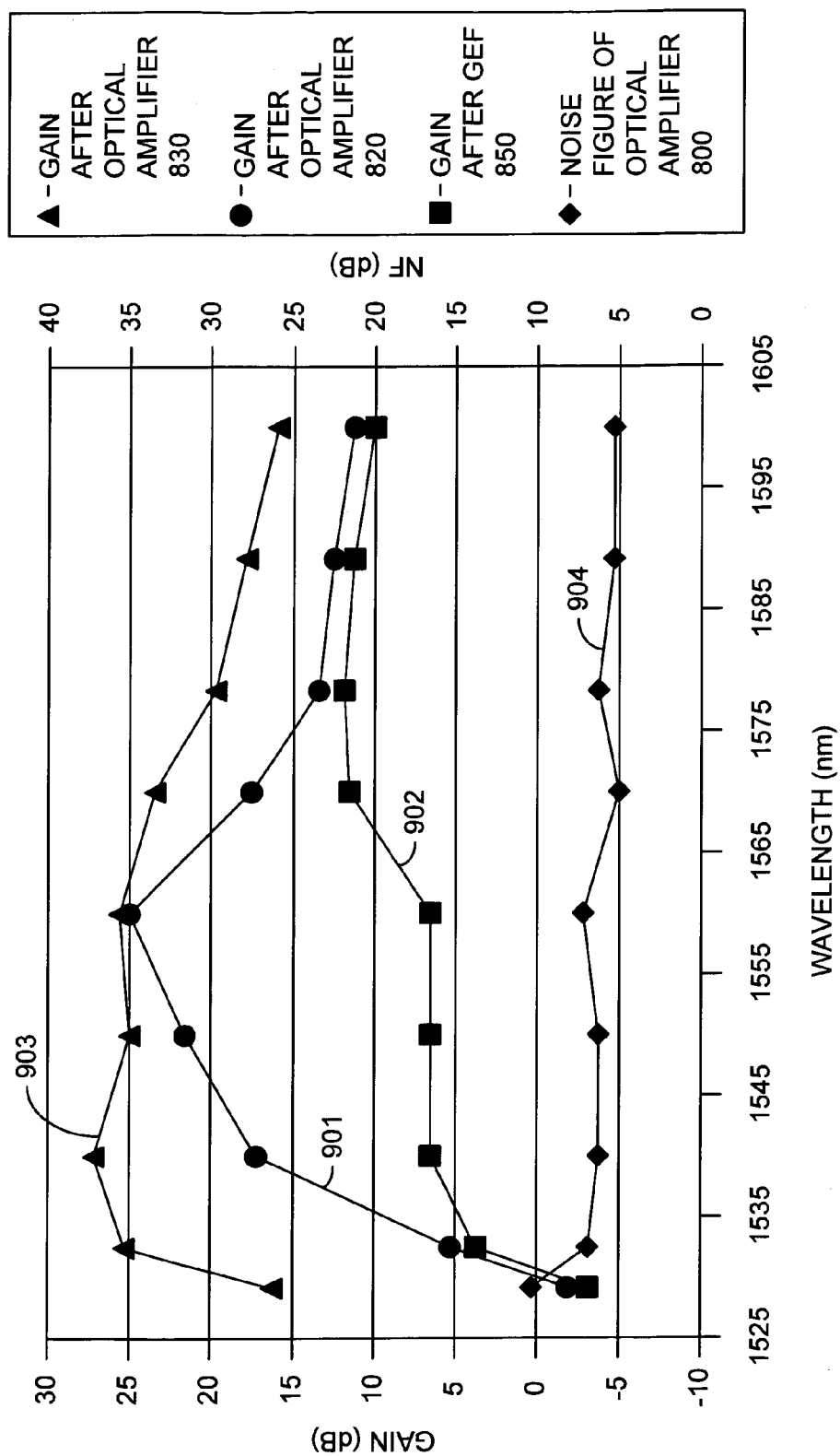
FIG. 9 is a graph illustrating the gain and noise figure (NF) generated by the optical amplifier system of FIG. 8 in an embodiment of the invention.

FIG. 9 is a graph illustrating the gain and noise figure (NF) generated by optical amplifier system 800 in an embodiment of the invention. Line 901 illustrates the gain generated by optical amplifier 820.

In FIG. 8, gain equalization filter 850 receives the optical signals from optical amplifier 820 through isolator 842. Gain equalization filter 850 flattens the gain generated by optical amplifier 820. In flattening the gain, gain equalization filter 850 adds gain for the shorter and longer wavelength ranges. Line 902 in FIG. 9 illustrates the gain after the optical signals pass through gain equalization filter 850.

Optical amplifier 830 receives the optical signals from gain equalization filter 850 through isolator 843 (see FIG. 8). Laser system 834 pumps F-EDF 832 to generate a gain for the channels. Optical amplifier 830 generates some gain for each of the channels, but generates a higher gain in range of about 1530 nm to 1560 nm due to the shorter length of F-EDF 832. The length of F-EDF 822 may also be set to amplify certain wavelengths, such as the wavelengths in the C-band. Line 903 in FIG. 9 illustrates the gain after the optical signals pass through optical amplifier 830.

FIG. 9 shows that optical amplifier system 800 generates about an 80 nm gain bandwidth. A minimum 16 dB gain is achieved over the 80 nm gain bandwidth. Thus, if optical amplifier system 800 were used in a CWDM network, optical amplifier system 800 could amplify four CWDM channels simultaneously. If optical amplifier system 800 were used in a CWDM/DWDM hybrid network, optical amplifier system 800 could amplify a large number of DWDM channels because of its high efficiency and high output power.

FIG. 9 also shows the noise figure of optical amplifier 800 as line 904. The noise figure is distributed around 6 dB, which is generally sufficient for CWDM networks.

In conclusion, the invention described herein provides an amplification solution for CWDM networks and CWDM/DWDM hybrid networks. Using the invention, CWDM networks and CWDM/DWDM hybrid networks can extend over longer distances. Consequently, CWDM networks and CWDM/DWDM hybrid networks can be utilized to provide service in more areas.

What is claimed is:

1. An optical amplifier system for a Coarse Wavelength Division Multiplexing (CWDM) network, the optical amplifier system comprising:
   a first optical amplifier having a fluoride-based optical fiber of a first length, the first optical amplifier being configured to receive optical signals for a plurality of CWDM channels and to amplify the CWDM channels, wherein a higher gain is generated for longer wavelengths of the CWDM channels; and
   a second optical amplifier having a fluoride-based optical fiber of a second length, the second optical amplifier being configured to receive the optical signals and to amplify the CWDM channels, wherein a higher gain is generated for shorter wavelengths of the CWDM channels;
   wherein the first optical amplifier and the second optical amplifier are configures to generate a continuous gain bandwidth of at least 80 nm to amplify the CWDM channels.

2. The optical amplifier system of claim 1 wherein the first length of fluoride-based optical fiber is different than the second length of fluoride-based optical fiber.

3. The optical amplifier system of claim 2 wherein the first length of fluoride-based optical fiber is between twice as long and four times as long as the second length of fluoride-based optical fiber.

4. The optical amplifier system of claim 1 wherein the fluoride-based optical fiber of the first optical amplifier comprises fluoride-based erbium doped fiber (F-EDF).

5. The optical amplifier system of claim 1 wherein the fluoride-based optical fiber of the first optical amplifier comprises cerium co-doped fluoride-based erbium doped fiber.

6. The optical amplifier system of claim 1 further comprising:
   a third optical amplifier having a fluoride-based optical fiber of a third length, wherein the third length of fluoride-based optical fiber is different than the second length of fluoride-based optical fiber and the first length of fluoride-based optical fiber;

the third optical amplifier receives the optical signals and amplifies the CWDM channels.

7. The optical amplifier system of claim 1 wherein:
the fluoride-based optical fiber of the first optical amplifier is longer than the fluoride-based optical fiber of the second optical amplifier; and
the longer length of fluoride-based optical fiber of the first optical amplifier generates a higher gain for the longer wavelengths of the CWDM channels.

8. The optical amplifier system of claim 7 wherein:
the shorter length of fluoride-based optical fiber of the second optical amplifier generates a higher gain for the shorter wavelengths of the CWDM channels.

9. The optical amplifier system of claim 1 further comprising:
a gain equalization filter connected between the first optical amplifier and the second optical amplifier that receives the optical signals from the first optical amplifier and flattens the gain generated by the first optical amplifier.

10. The optical amplifier system of claim 1 wherein the CWDM network comprises a CWDM/Dense Wavelength Division Multiplexing (DWDM) hybrid network and at least one of the CWDM channels is replaced by a plurality of DWDM channels.

11. The optical amplifier system of claim 1 further comprising:
a first laser system that pumps the fluoride-based optical fiber of the first optical amplifier; and
a second laser system that pumps the fluoride-based optical fiber of the second optical amplifier.

12. The optical amplifier system of claim 1 wherein the first optical amplifier amplifies at least three CWDM channels.

13. The optical amplifier system of claim 12 wherein the second optical amplifier amplifies at least three CWDM channels.

14. A method of amplifying Coarse Wavelength Division Multiplexing (CWDM) channels of a CWDM network, the method comprising the steps of:
receiving optical signals for a plurality of CWDM channels in a first optical amplifier having a fluoride-based optical fiber of a first length;
amplifying the CWDM channels with the first optical amplifier, wherein a higher gain is generated for longer wavelengths of the CWDM channels;
receiving the optical signals in a second optical amplifier having a fluoride-based optical fiber of a second length; and
amplifying the CWDM channels with the second optical amplifier, wherein a higher gain is generated for shorter wavelengths of the CWDM channels;
wherein the first optical amplifier and the second optical amplifier are configured to generate a continuous gain bandwidth of at least 80 nm to amplify the CWDM channels.

15. The method of claim 14 wherein the first length of fluoride-based optical fiber is different than the second length of fluoride-based optical fiber.

16. The method of claim 15 wherein the first length of fluoride-based optical fiber is between twice as long and four times as long as the second length of fluoride-based optical fiber.

17. The method of claim 14 wherein the fluoride-based optical fiber of the first optical amplifier comprises fluoride-based erbium doped fiber (F-EDF).

18. The method of claim 14 wherein the fluoride-based optical fiber of the first optical amplifier comprises cerium co-doped fluoride-based erbium doped fiber.

19. The method of claim 14 further comprising the steps of:
receiving the optical signals in a third optical amplifier having a fluoride-based optical fiber of a third length, wherein the third length of fluoride-based optical fiber is different than the second length of fluoride-based optical fiber and the first length of fluoride-based optical fiber; and
amplifying the CWDM channels with the third optical amplifier.

20. The method of claim 14 wherein:
the fluoride-based optical fiber of the first optical amplifier is longer than the fluoride-based optical fiber of the second optical amplifier; and
the longer length of fluoride-based optical fiber of the first optical amplifier generates a higher gain for the longer wavelengths of the CWDM channels.

21. The method of claim 20 wherein the shorter length of fluoride-based optical fiber of the second optical amplifier generates a higher gain for the shorter wavelengths of the CWDM channels.

22. The method of claim 14 further comprising the step of:
flattening the gain generated by the first optical amplifier using a gain equalization filter connected between the first optical amplifier and the second optical amplifier.

23. The method of claim 14 wherein the CWDM network comprises a CWDM/Dense Wavelength Division Multiplexing (DWDM) hybrid network and at least one of the CWDM channels is replaced by a plurality of DWDM channels.

24. The method of claim 14 further comprising the steps of:
pumping the fluoride-based optical fiber of the first optical amplifier with a first laser system; and
pumping the fluoride-based optical fiber of the second optical amplifier with a second laser system.

25. The method of claim 14 wherein the step of amplifying the CWDM channels with the first optical amplifier comprises:
amplifying at least three CWDM channels with the first optical amplifier.

26. The method of claim 25 wherein the step of amplifying the CWDM channels with the second optical amplifier comprises:
amplifying at least three CWDM channels with the second optical amplifier.

* * * * *